(12) United States Patent
Fordyce, III et al.

(10) Patent No.: US 8,799,067 B2
(45) Date of Patent: Aug. 5, 2014

(54) SYSTEM AND METHOD FOR A MERCHANT DEBIT CARD PROGRAM INCLUDING A PLURALITY OF ISSUERS

(75) Inventors: Edward Winfield Fordyce, III, Sedalia, CO (US); Mary Pat McMahon, Orinda, CA (US); Jennifer Schulz, Santa Monica, CA (US)

(73) Assignee: Visa USA Inc., San Francisco, CA (US)

( * ) Notice: Subject to any disclaimer, the term of this patent is extended or adjusted under 35 U.S.C. 154(b) by 669 days.

(21) Appl. No.: 12/412,361

(22) Filed: Mar. 27, 2009

(65) Prior Publication Data

US 2010/0070354 A1 Mar. 18, 2010

Related U.S. Application Data

(60) Provisional application No. 61/096,589, filed on Sep. 12, 2008.

(51) Int. Cl.
*G06Q 30/00* (2012.01)
*G06Q 40/00* (2012.01)

(52) U.S. Cl.
USPC ............................................ 705/14.3; 705/39

(58) Field of Classification Search
None
See application file for complete search history.

(56) References Cited

U.S. PATENT DOCUMENTS

| | | | |
|---|---|---|---|
| 6,014,645 A * | 1/2000 | Cunningham | 705/38 |
| 7,104,443 B1 * | 9/2006 | Paul et al. | 235/380 |
| 7,392,224 B1 * | 6/2008 | Bauer et al. | 705/41 |
| 2002/0107731 A1 | 8/2002 | Teng | |
| 2005/0021456 A1 * | 1/2005 | Steele et al. | 705/39 |
| 2007/0198338 A1 | 8/2007 | Heywood | |
| 2008/0010154 A1 | 1/2008 | Tietzen et al. | |
| 2008/0059306 A1 | 3/2008 | Fordyce et al. | |
| 2009/0261160 A1 * | 10/2009 | Rozbicki et al. | 235/380 |

OTHER PUBLICATIONS

PCT International Search Report and Written Opinion, PCT Application No. PCT/US2009/056732, mailed Apr. 26, 2010, 7 pages.

* cited by examiner

*Primary Examiner* — John G Weiss
*Assistant Examiner* — Eric Netzloff
(74) *Attorney, Agent, or Firm* — Kilpatrick Townsend & Stockton LLP (57) ABSTRACT

A merchant debit card program is described that includes a plurality of authorized issuers for debit card accounts. The merchant debit card program includes a merchant loyalty program that provides rewards to enrolled debit card accounts. The authorized issuers provide management of the debit card accounts including customer statements, payment authorizations and customer service. Application data for a new debit card account is transmitted from the merchant to the selected issuer by a card processing system. Enrollment data to the merchant loyalty program may also be transmitted from the merchant to an authorized issuer by the card processing system.

48 Claims, 8 Drawing Sheets

SYSTEM AND METHOD FOR A MERCHANT DEBIT CARD PROGRAM INCLUDING A PLURALITY OF ISSUERS

CROSS-REFERENCE TO RELATED PATENTS

The present U.S. Utility Patent Application claims priority pursuant to 35 U.S.C. §119(e) to U.S. Provisional Patent Application Ser. No. 61/096,589, entitled "System and Method for a Merchant Debit Card Program Including a Plurality of Issuers", filed Sep. 12, 2008.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to a system and method for debit card processing and more particularly to a system and method for processing of a merchant debit card program which includes a plurality of issuers.

2. Description of Related Art

A debit card is associated with a deposit account, such as a checking, savings, or other type of financial account. When a purchase is made with a debit card, the funds are deducted from the balance in the associated deposit account. Typically, the issuer of the debit card maintains the associated deposit account.

Different types of debit cards are currently offered in the marketplace. For example, two types of debit cards are an online debit card and an offline debit card. Online debit cards require electronic authorization of every transaction. The transaction may be additionally secured with a personal identification number or PIN authentication. Online debit transactions can be handled by regional ATM networks or by a national proprietary debit network such as the Interlink network operated by VISA Inc. When an online debit transaction is authenticated using the PIN, it offers the service of obtaining cash back from a merchant.

Offline debit cards are processed in a similar manner as a credit card. Offline debit transactions are processed through a proprietary card processing network such as VISANET operated by VISA Inc. in the same manner as credit card transactions. As such, offline debit cards are generally accepted worldwide at virtually all merchants that accept credit cards of the corresponding brand. Online debit card service and offline debit card services may be provided as features on the same debit card.

Debit cards have gained popularity with a shift from cash and checks to debit spending by many consumers. Merchants have offered co-branded credit cards in the past that also provide merchant loyalty reward programs. Due to their growing popularity, merchants are now seeking to offer co-branded debit cards that also provide merchant loyalty reward programs to customers. However, since debit cards must be associated with a deposit account, it is difficult for merchants to establish a national or international debit card program with a single issuer. If a customer does not have an existing banking relationship with the single issuer, the customer is reluctant to move an existing account or open a new account with the single issuer to obtain a merchant debit card. In addition, merchants generally fund the loyalty reward program themselves due to the lack of funding that an issuer typically shares on revenue from out-of-store purchases.

One current solution includes having a single issuer associate a merchant co-branded debit card with an existing customer account at another financial institution. When a purchase is made, the issuer then coordinates the withdrawal or debit of funds from the customer's account using an automated clearing house (ACH) network. However, there are severe disadvantages to an ACH network for debit card transactions. ACH processes large volumes of debit transactions which are originated in batches. The ACH network aggregates the ACH transactions by a customer each day and then withdraws the total amount of the ACH transactions from the associated debit account. The customer's deposit account thus only reflects a single, aggregated withdrawal and does not track each individual transaction. It is difficult then for a customer to dispute a single transaction or charge from their merchant debit card. This disadvantage presents regulatory issues as well.

Therefore, a need exists for an improved merchant debit card program that overcomes these disadvantages.

DETAILED DESCRIPTION OF EMBODIMENTS OF THE INVENTION

In an embodiment, a merchant debit card program is established with a plurality of authorized issuers. The merchant debit card program includes a merchant loyalty program that provides rewards to enrolled debit card accounts. The authorized issuers provide management of the debit card accounts including customer statements, payment authorizations and customer service. Application data for a new debit card account is transmitted from a merchant system to one or more authorized issuers by a card processing system. Enrollment data for the merchant loyalty program may also be transmitted from the merchant system to an authorized issuer by the card processing system. When debit card accounts are used by the customers, the card processing system performs authorization of the transaction and clearing and settlement of the transaction with the issuers and merchant. The card processing system may also identify qualified transactions that are eligible to earn rewards under the merchant loyalty program. The merchant or card processing system may process the qualified transactions to determine rewards for the debit card accounts. The reward data is reported to the authorized issuers of the associated debit card accounts for the customers' account statements.

Figure 1:
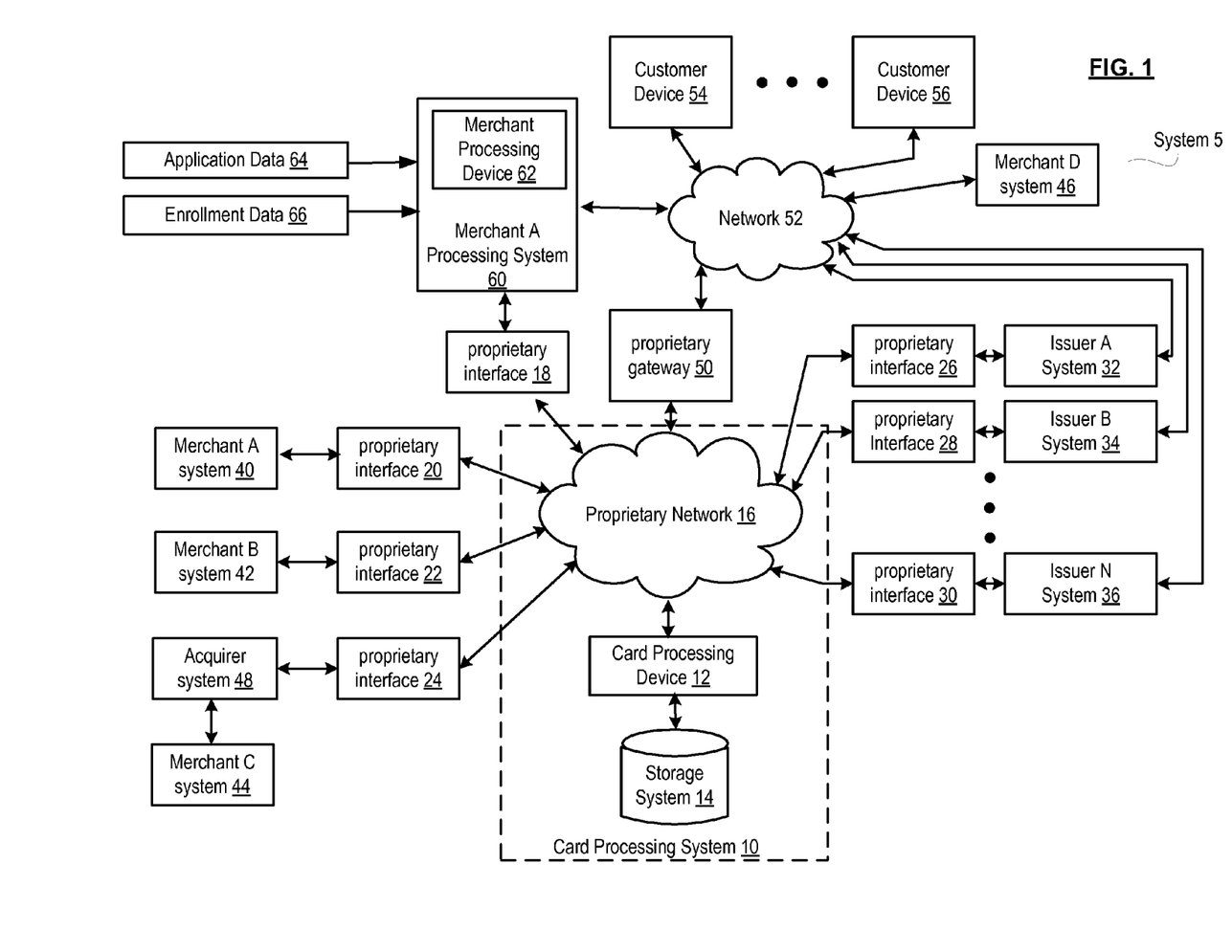
FIG. 1 is a schematic block diagram of an embodiment of a processing system in accordance with the present invention.

FIG. 1 is a schematic block diagram of an embodiment of a system 5 that includes a card processing system 10, a plurality of proprietary interfaces 18-30, a plurality of issuer systems 32-36, a plurality of merchant systems 40-46, a merchant processing system 60, one or more acquirer systems 48, a proprietary gateway 50, a wide area network 52, and a plurality of customer devices 54-56. The merchant systems 40-46 are point of sale devices associated with a merchant that sells products and/or services. Such a merchant may have a single location or multiple national or international locations. The merchant may have an online or internet store. The issuer systems 32-36 are each associated with a different issuer. An issuer is a bank, financial institution or other entity that issues a debit card to commercial entities or consumers.

The card processing system 10 includes a card processing device 12, a storage system 14 and a proprietary network 16. The card processing device 12 includes one or more computing devices (e.g., computers, servers, super computers, main frames, etc.) coupled to the proprietary network 16. The proprietary network 16 and card processing device 12 have a storage system 14 coupled thereto. The storage system 14 may be one or more databases implemented in internal memory devices, storage area networks, network attached storage devices, or other storage devices located in one geographical location or multiple geographical locations. The storage system 14 may be structured as relational, network, hierarchal or object based or other type of structured database operable to store and locate data files.

The card processing device 12, the storage system 14, and the proprietary network 16 may be operated and maintained by a single transactional processing entity. For example, Visa, Inc. may provide its VisaNet® or Interlink® or Visa/Plus® ATM Network or combination thereof as the proprietary network 16. In another embodiment, the card processing system 12, the storage system 14 and the proprietary network 16 are owned and operated by different legal entities.

The network 52 provides access to the proprietary network 16 through the proprietary gateway 50. The network 52 may be a wide area network, such as the internet, or an access network or another proprietary network that connects devices to the proprietary network 16 through the proprietary gateway 50. The proprietary gateway 50 includes one or more edge network nodes that control access to the proprietary network 16 and may also provide firewall and routing services to the proprietary network 16 to ensure only authorized communications are transmitted in the proprietary network 16.

The merchant processing system 60 includes a merchant processing device 62 and may also include other nodes, networks, storage systems or other devices. The merchant processing system 60 is operable to receive application data 64 and enrollment data 66. In an embodiment, application data 64 and enrollment data 66 may be received from a web browser running on a customer device 54-56 that accesses a debit card order graphical user interface (GUI) program, such as HTML documents, downloaded from a web server at either one of the plurality of issuer systems 32-36 or from the merchant processing system 60.

Figure 2:
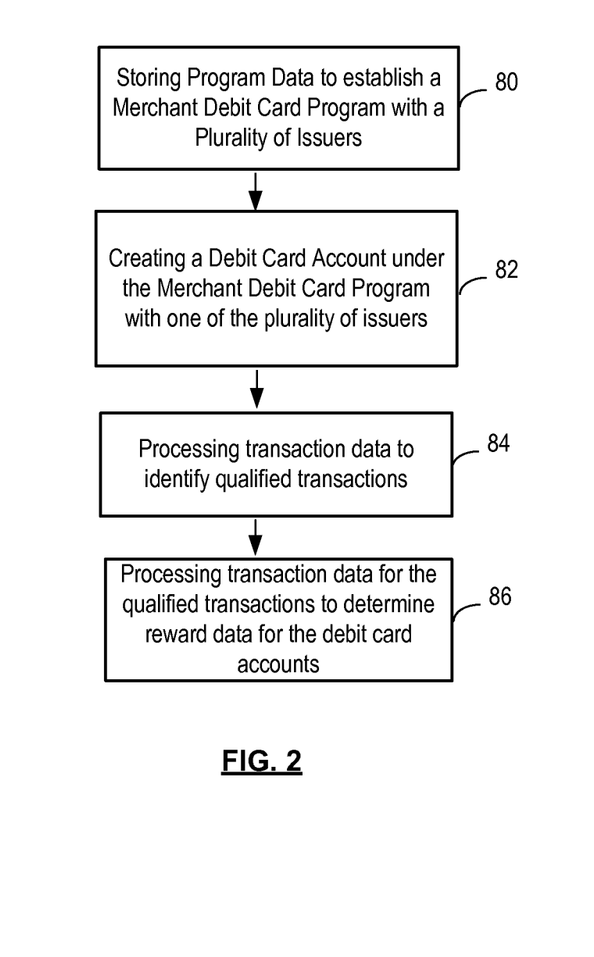
FIG. 2 is a logic diagram of an embodiment of a method for a merchant debit card program in accordance with the present invention.

FIG. 2 is a logic diagram of an embodiment of a method for a merchant debit card program in accordance with the present invention. To establish the merchant debit card program, the merchant and plurality of authorized issuers agree on financial and other terms for issuance of debit card accounts under the merchant debit card program. The authorized issuers also agree on management of deposit accounts associated with the debit card accounts. The authorized issuers may also be requested to perform certain support processes for the merchant loyalty program, such as reporting reward data on deposit account statements, management of reward redemptions, etc. In step 80, the merchant debit card program data is transmitted by the merchant processing system 60 to the card processing system 10. The card processing system 10 stores the merchant debit card program data in storage system 14. The program data includes information for the plurality of issuers. In step 82, a debit card account is created by the card processing system 10 under the merchant debit card program. The debit card account includes an identification of one of the plurality of authorized issuers. In addition, the debit card account may include enrollment data in the merchant loyalty program. In step 84, the card processing system 10 processes transaction data from a plurality of financial transactions. The plurality of financial transactions includes transactions from debit card accounts enrolled in the merchant loyalty program as well as financial transactions from other card accounts. The card processing system 10 identifies the qualified transactions from the plurality of financial transactions that are eligible or qualified to receive rewards under the merchant loyalty program. In step 86, the qualified transactions are processed to determine reward data, such as currency, points, miles or other rewards, for the associated debit card accounts. The merchant processing system 60 or card processing system may perform the processing in step 86. Reward data for the debit card accounts is then consolidated and transmitted to the merchant processing system 60. The reward data is also transmitted to each of the authorized issuer systems 32-36 for their respective debit card accounts.

Figure 3:
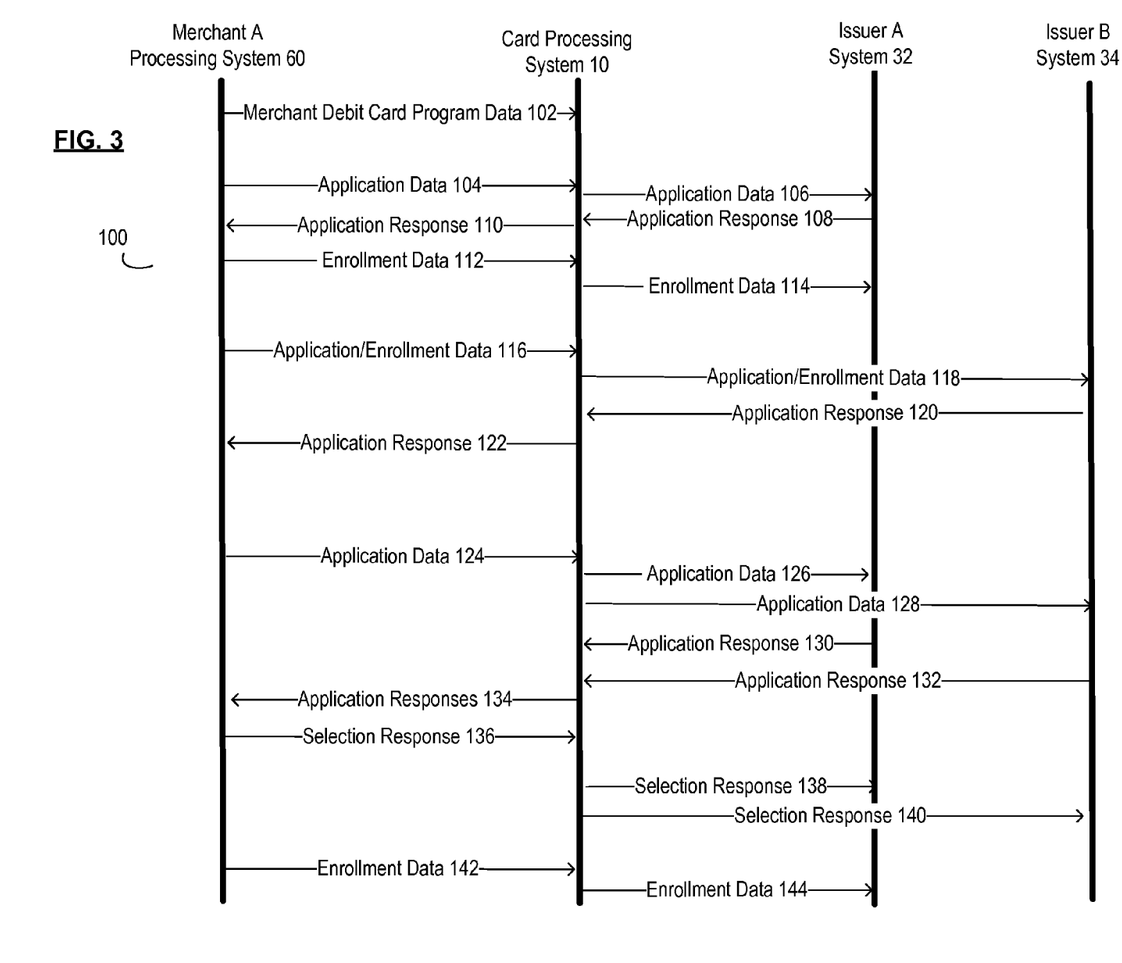
FIG. 3 is a logic diagram of another embodiment of a method for a merchant debit card program in accordance with the present invention

FIG. 3 illustrates a logic diagram of an embodiment of a method 100 for a merchant debit card program in accordance with the present invention. The method 100 illustrates several embodiments that may be employed to select one of the plurality of authorized issuers for a debit card account under the merchant loyalty program. Though only issuer A system 32 and issuer B system 34 are shown, additional issuer systems may be included in the embodiments described. As shown in step 102, merchant debit card program data is transmitted from the merchant processing system 60 to the card processing system 10 to establish the merchant debit card program. The merchant debit card program data includes issuer data for a plurality of issuers. In an embodiment, the merchant debit card program data also includes merchant loyalty program data. The card processing system 10 stores the program data in storage system 14.

In step 104, the merchant processing system 60 transmits application data to the card processing system 10. In an embodiment, the application data 64 includes a selection or identification from a customer of one of the plurality of authorized issuers. For example, a customer may request a debit card account to be associated with an existing deposit account managed by an authorized issuer. In another example, a customer may include a request for a new deposit account with a selected authorized issuer as well as a debit card account. For example, a customer may not have an existing deposit account with one of the authorized issuers and prefers to open a new deposit account with one of the authorized issuers. In another embodiment, the merchant processing system 60 may select an authorized issuer and include an identification of the authorized issuer in the application data. For example, the merchant processing system 60 may select an authorized issuer based on issuer selection criteria, such as geographical region, application flow, financial terms or other criteria.

When the application data 64 includes an identification of an authorized issuer, the card processing system 10 processes the application data and transmits application data to the selected authorized issuer as shown in step 106. The application data transmitted to the selected authorized issuer may be the same application data or may be modified by the card processing system 10. The selected authorized issuer then transmits an application response with an acceptance or rejection of the debit card account and if requested, an associated deposit account. The application response may also include debit card account and deposit account terms and conditions. The card processing system 10 receives the application response in step 108 and transmits the application response to the merchant processing system 60 in step 110.

When accepted, enrollment data for the debit card account in the merchant loyalty program is transmitted in step 112 to the card processing system 10. The card processing system 10 transmits the enrollment data to the authorized issuer in step 114. Alternatively, the enrollment data for the merchant loyalty program may also be included in the application data.

In another embodiment, the application data does not include a selection or identification of one of the plurality of issuers. In step 116, application data, including enrollment data, is transmitted to the card processing system 10. In this embodiment, the card processing system 10 selects one of the plurality of authorized issuers. For example, the card processing system 10 may select an authorized issuer based on issuer selection criteria from the merchant processing system 10, such as geographical region, application flow, financial terms or other criteria. The card processing system 10 then transmits the application data and enrollment data to the selected authorized issuer in step 118. The selected authorized issuer then transmits an application response with an acceptance or rejection of the debit card account and if requested, an associated deposit account in step 120. The card processing system 10 receives the application response and transmits the application response to the merchant processing system 60 in step 122.

In another embodiment, the card processing system 10 transmits the application data to more than one of the plurality of issuers. The application data may include an identification of multiple authorized issuers selected by the customer. Alternatively, the merchant processing system 60 or card processing system 10 may select multiple issuers based on issuer selection criteria, such as geographical region, application flow, financial terms or other criteria. In step 124, the card processing system 10 receives the application data and transmits the application data to a plurality of authorized issuers in steps 126 and 128. The card processing system 10 receives application response from a plurality of issuers in steps 130, 132. The application response from each issuer includes either a rejection of the application or an approval of the debit card account and deposit account, if requested, with the issuer's terms and conditions. The card processing system transmits the application responses to the merchant processing system 60 in step 134. When more than one of the plurality of issuers approves an application, in step 136, the card processing system 10 receives a selection response from the merchant processing system 60. The selection response includes a selection of one of the responding authorized issuers. The selection of the issuer may be performed by the customer, e.g. based on preference of an issuer's terms and conditions or other criteria. The selection of the issuer may also be performed by the merchant processing system 60 or card processing system 10 based on issuer selection criteria, such as geographical region, application flow, financial terms or other criteria. The card processing system 10 transmits the selection response to the responding authorized issuers in step 138 and 140.

In another embodiment, an existing debit card account is enrolled in the merchant loyalty program. In step 142, enrollment data for an existing debit card account is received by the card processing system 10. The card processing system 10 transmits the enrollment data to the issuer of the existing debit card account in step 144.

Figure 4:
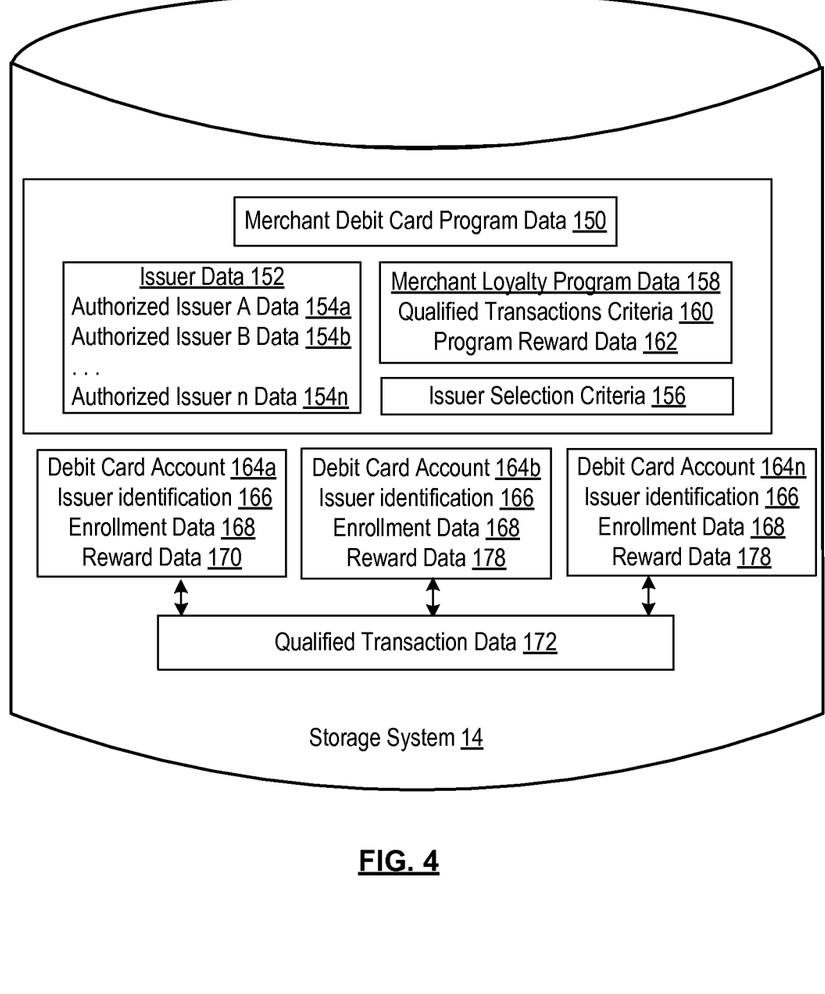
FIG. 4 is a schematic block diagram of an embodiment of a storage system in accordance with the present invention.

FIG. 4 is a schematic block diagram of an embodiment of the storage system 14 in accordance with the present invention. FIG. 4 illustrates the type of data that may be stored by the card processing system 10 in an embodiment of the invention. The merchant debit card program data 150 includes issuer data 152 and authorized issuer data 154a-n for each of the plurality of authorized issuers. The issuer data 152 includes identification of the authorized issuers, financial terms, and other needed data applicable to the plurality of authorized issuers. The authorized issuer data 154a-n includes data applicable to one of the authorized issuers. Issuer selection criteria 156 may also stored in an embodiment of the invention. Issuer selection criteria includes information for the card processing system 10 to select an authorized issuer from the plurality of issuers 32-26, e.g. for transmission of application data. The merchant debit card program data 150 also includes merchant loyalty program data 158. The merchant loyalty program data 158 includes qualified transactions criteria 160 and program reward data 162 needed to process transaction data for the merchant loyalty program.

The storage system 14 also stores information for debit card accounts 164a-n issued under the merchant debit card program. The debit card accounts 164a-n include issuer identification 166 that provides identification of the issuer for the debit card account. Enrollment data 168 is stored that specifies enrollment status of the debit card account under the merchant loyalty program. In an embodiment, reward data 170 may also be stored for the debit card accounts 164*a-n*. The storage system 14 also stores qualified transaction data 172 for the merchant loyalty program in one or more consolidated files.

Figure 5:
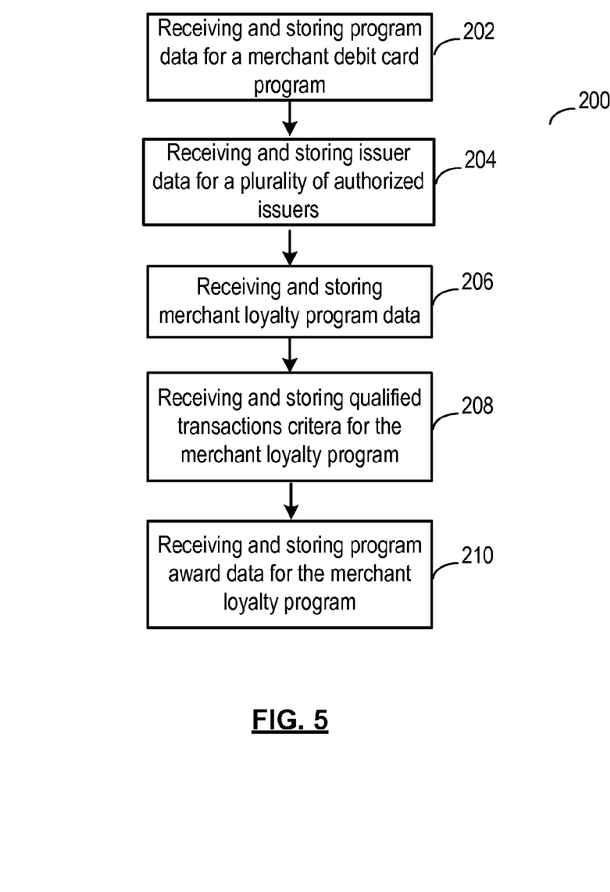
FIG. 5 is a logic diagram of an embodiment of a method for establishing a merchant debit card program data in accordance with the present invention.

FIG. 5 is a logic diagram of an embodiment of a method 200 for establishing a merchant debit card program in accordance with the present invention. In step 202, the card processing system 10 receives and stores program data 150 for a merchant debit card program. In step 204, card processing system 10 receives and stores issuer data 152, 154 for a plurality of authorized issuers. In step 206, the card processing system 10 receives and stores merchant loyalty program data 158 for the merchant loyalty program. In step 208, the card processing system 10 receives and stores qualified transaction criteria 160 to identify transactions qualified to receive rewards under the merchant loyalty program. In step 210, the card processing system 10 receives and stores program reward data 162 that provides guidelines or policies or rules for assigning rewards, such as points, miles, credits, cash back, etc., to a debit card account based on the qualified transactions.

Figure 6:
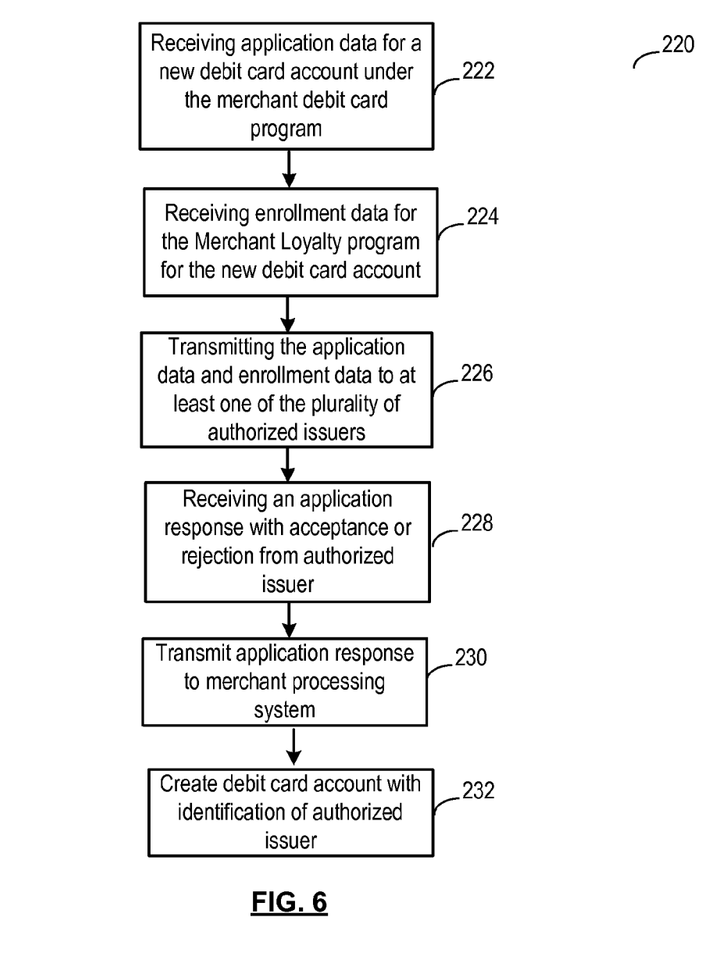
FIG. 6 is a logic diagram of an embodiment of a method for creating a debit card account under the merchant debit card program in accordance with the present invention.

FIG. 6 illustrates a logic diagram of an embodiment of a method 220 for creating a debit card account under the merchant debit card program in accordance with the present invention. In steps 222 and 224, the card processing system 10 receives application data for a debit card account and enrollment data for the merchant loyalty program. In step 226, the card processing system 10 transmits the application data and enrollment data to one of the plurality of authorized issuer systems 32-36, wherein the one of the plurality of authorized issuers manages a deposit account identified in the application data. In step 228, the card processing system 10 receives an application response with an acceptance or rejection of the debit card account. In step 230, the card processing system 10 transmits the application response to the merchant processing system 60. When an approval is received from the authorized issuer in the application response, the card processing system 10 creates a debit card account with an identification of the authorized issuer in step 232.

Figures 7, 8:
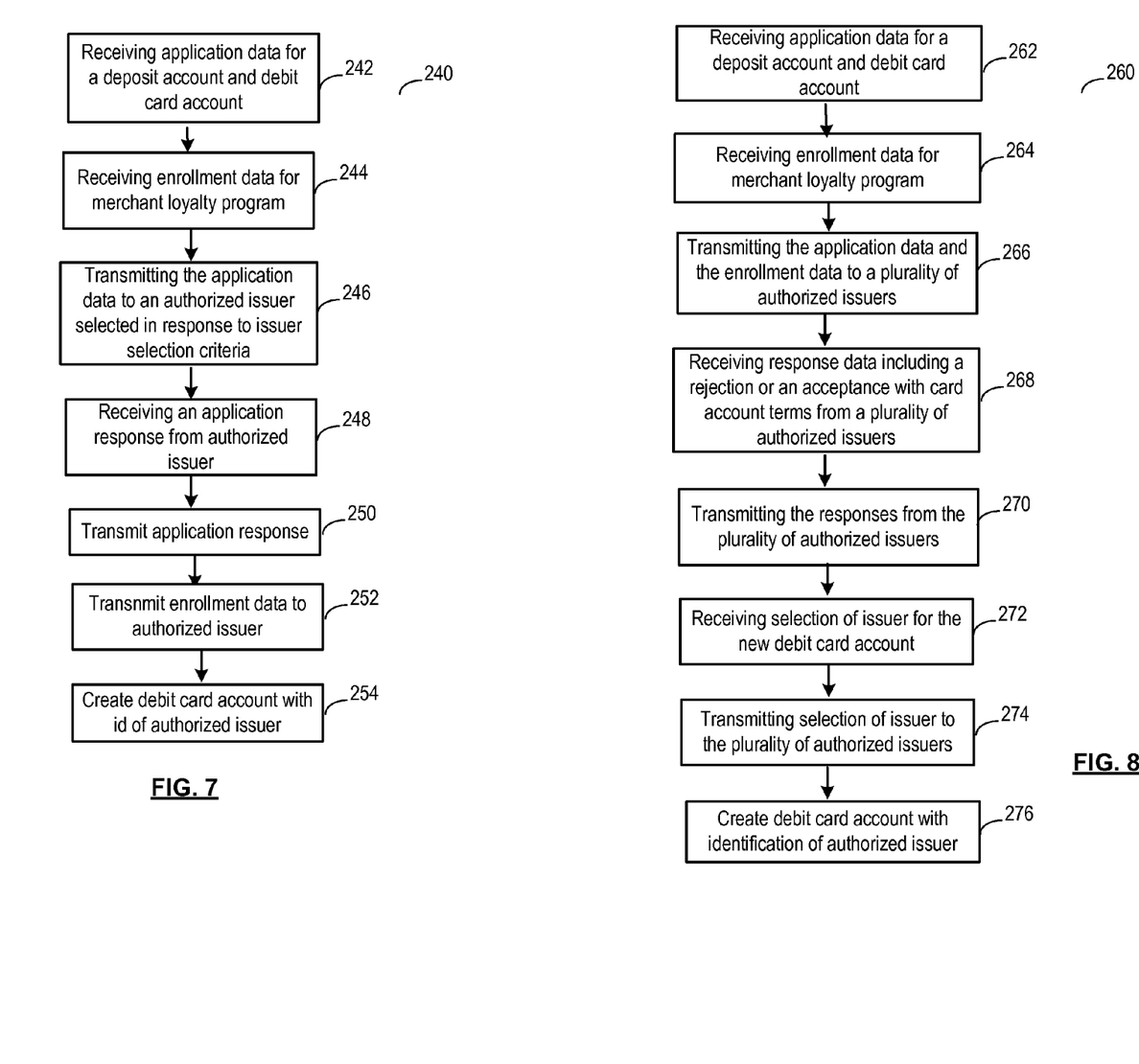
FIG. 7 is a logic diagram of another embodiment of a method for creating a debit card account under the merchant debit card program in accordance with the present invention.
FIG. 8 is a logic diagram of another embodiment of a method for creating a debit card account under the merchant debit card program in accordance with the present invention.

FIG. 7 is a logic diagram of another embodiment of a method 240 for creating a debit card account under the merchant debit card program in accordance with the present invention. In step 242, the card processing system 10 receives application data for a deposit account and debit card account. In step 244, the card processing system 10 receives enrollment data for the merchant loyalty program. In step 246, the card processing system 10 transmits the application data to one of the plurality of authorized issuer systems 32-36, wherein the one of the plurality of authorized issuers is selected based on issuer selection criteria. In step 248, the card processing system 10 receives an application response with an acceptance or rejection of the debit card account and deposit account. In step 250, the card processing system 10 transmits the application response to the merchant processing system 60. When receiving approval of the debit card account from the selected authorized issuer, the card processing system 10 transmits enrollment data to the authorized issuer system 32-36 in step 252. In step 254, the card processing system 10 creates a new debit card account with the debit card application data, wherein the debit card account includes an identification of the authorized issuer.

FIG. 8 is a logic diagram of another embodiment of a method 260 for creating a debit card account under the merchant debit card program in accordance with the present invention. In step 262, the card processing system receives application data for a deposit account and debit card account. In step 264, the card processing system 10 receives enrollment data for the merchant loyalty program. In step 266, the card processing system 10 transmits the application data and enrollment data to a plurality of authorized issuer systems 32-36. In step 268, the card processing system 10 receives application response data from one or more of the plurality of the authorized issuer systems 32-36, wherein the application response data includes an acceptance or approval for a debit card account and card account terms for the debit card account. The application response data may also include a rejection of the debit card account. In step 270, the card processing system 10 transmits the application response data from the one or more of the plurality of authorized issuers to the merchant processing system 60. In step 272, the card processing system 10 receives a selection of an authorized issuer. In step 274, the card processing system 10 transmits the selection to the selected authorized issuer system 32-36. In step 276, the card processing system 10 creates a new debit card account with the debit card application data, wherein the debit card account includes an identification of the selected authorized issuer.

Figure 9:
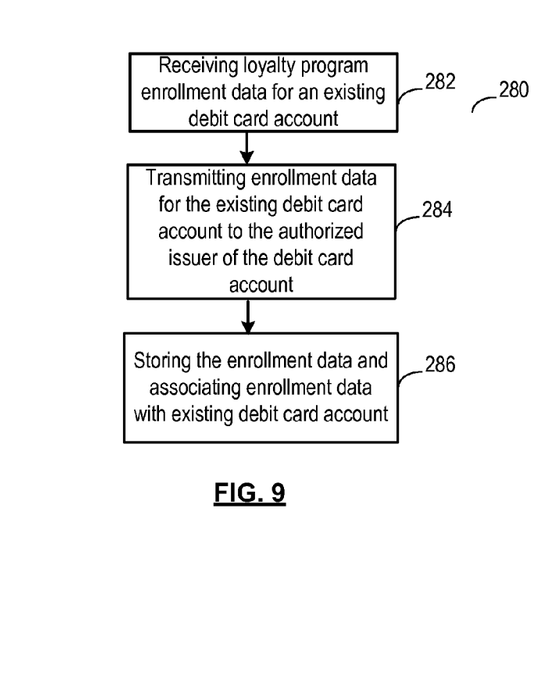
FIG. 9 is a logic diagram of an embodiment of a method for enrolling a debit card account under a merchant loyalty program in accordance with the present invention.

FIG. 9 is a logic diagram of an embodiment of a method 280 for enrolling a debit card account under a merchant loyalty program in accordance with the present invention. In this embodiment, an existing debit card account is enrolled in the merchant loyalty program. In step 282, card processing system 10 receives enrollment data for an existing debit card account. In step 284, the card processing system 10 transmits the enrollment data to the issuer system 32-36 of the existing debit card account. In step 286, the card processing system 10 stores the enrollment data in the existing debit card account in the storage system 14.

Figure 10:
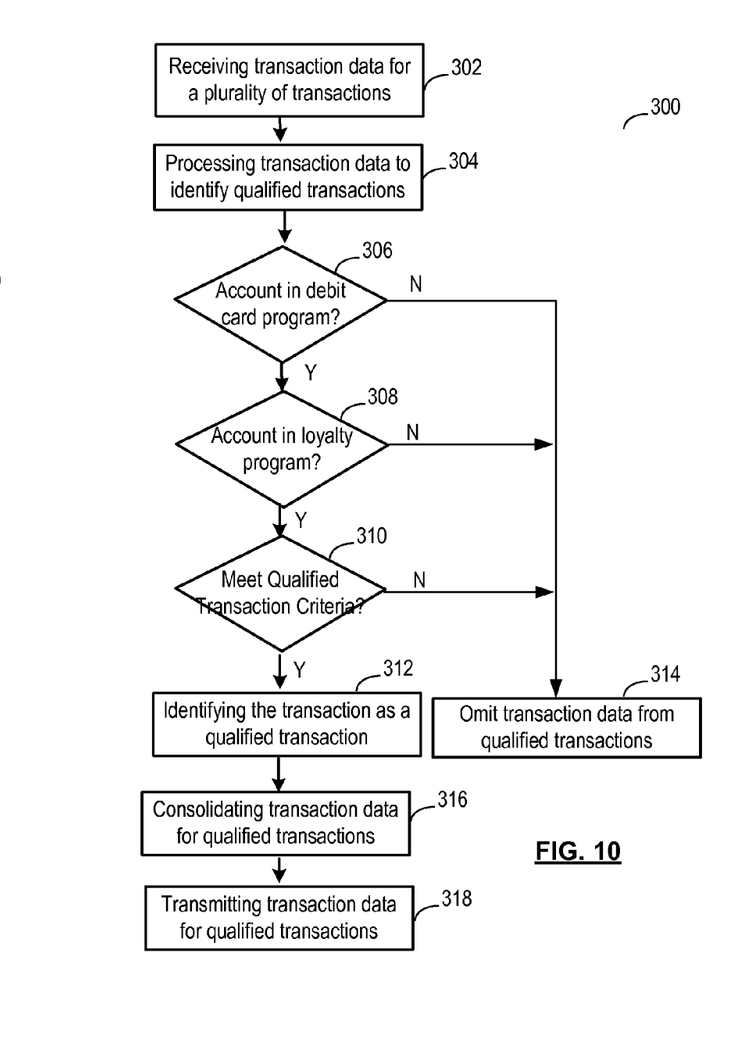
FIG. 10 is a logic diagram of an embodiment of a method for processing transaction data to identify qualified transactions for a merchant loyalty program in accordance with the present invention.

FIG. 10 is a logic diagram of an embodiment of a method 300 for processing transaction data to identify qualified transactions for a merchant loyalty program in accordance with the present invention. In step 302, the card processing system 10 receives transaction data for a plurality of financial transactions. The transactions may be received from a plurality of different merchant systems 40-46 or acquirers 48, as shown in FIG. 1. The transactions may be from a plurality of different types of cards, including credit cards, debit cards, prepaid cards, gift cards, etc. In step 304, the card processing system 10 processes the transaction data from the plurality of financial transactions to identify qualified transactions. Qualified transactions include transactions from debit card accounts enrolled in the merchant loyalty program that are eligible for rewards. In one embodiment, the card processing system 10 identifies qualified transactions by determining from the transaction data whether the card account is associated with the merchant debit card program as shown in step 306. When the card account is associated with the merchant debit card program, the card processing system 10 determines from the transaction data whether the debit card account is enrolled in the merchant loyalty program as shown in step 308. When the debit card account is enrolled in the merchant loyalty program, the card processing system 10 determines from the transaction data whether the transaction meets the qualified transaction criteria 160 for the merchant loyalty program, as shown in step 310.

The qualified transaction criteria 160 defines transactions that are eligible for rewards under the merchant loyalty program. The qualified transaction criteria 160 may be modified as desired by the merchant from time to time in managing the merchant loyalty program. For example, the qualified transaction criteria 160 may specify that only transactions originating from the merchant are qualified for rewards under the merchant loyalty program. The qualified transaction criteria 160 may specify that only transactions over a certain value or dollar amount are qualified for rewards under the merchant loyalty program. The qualified transaction criteria 160 may specify that only a specified number of transactions during a period qualify for rewards under the merchant loyalty program. The qualified transaction criteria 160 may include different requirements, policies or criteria as well.

When the transaction meets the qualified transaction criteria 160, the card processing system 10 identifies the transaction as a qualified transaction under the merchant loyalty program, as shown in step 312. When a transaction fails to meet one of the requirements, the card processing system 10 omits the transaction data from the qualified transactions, as shown in step 314.

In an embodiment, the card processing system 10 consolidates the transaction data for the qualified transactions in one or more files in step 316 and in step 318, transmits the qualified transactions to a merchant processing system. The card processing system 10 may transmit the consolidated files of transaction data for qualified transactions on a daily basis, weekly basis or other time period.

Figure 11:
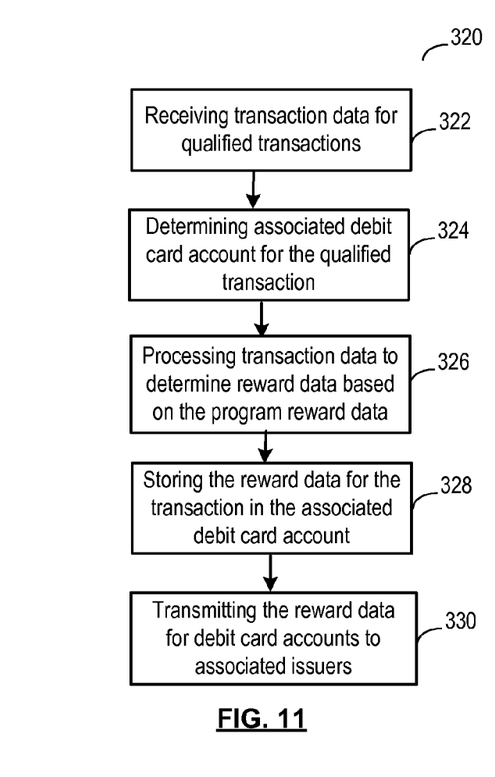
FIG. 11 is a logic diagram of an embodiment of a method for processing transaction data for qualified transactions to determine reward data for a merchant loyalty program in accordance with the present invention.

FIG. 11 is a logic diagram of an embodiment of a method 320 for processing transaction data for qualified transactions to determine reward data for a merchant loyalty program in accordance with the present invention. In an embodiment, the merchant processing system 60 processes the transaction data to determine reward data. In this embodiment, the merchant processing system 60 receives the consolidated files of transaction data for qualified transactions from the card processing system 10 as shown in step 322. In step 324, the merchant processing system 60 determines associated debit card accounts for the qualified transactions and in step 326, processes the transaction data to determine reward data based on the program reward data 162.

The program reward data includes criteria, rules, policies or requirements for assigning reward data to debit card accounts for qualified transactions. For example, the program reward data may specify that qualified transactions originating from the merchant receive a first predetermined number of reward points while qualified transactions originating from other merchants receive a second number of reward points. The program reward data may specify that reward points are assigned based on value or dollar amount of the transaction or based on a number of transactions. The program reward data may specify that rewards include points or miles toward future purchases from the merchant, cash back rewards, discounts or credits at the merchant, credits that may be exchanged for other merchant products or services, etc.

When the reward data is determined, the merchant processing system 60 stores reward data for the qualified transactions in associated debit card accounts in step 328. In step 330, the merchant processing system 60 transmits the reward data for debit card accounts to the authorized issuer systems 32-36 via the network 52 or via the proprietary network 16. The merchant processing system 60 may transmit the reward data to the card processing system 10 as well.

In another embodiment, the card processing system 10 processes the transaction data to determine reward data as shown in steps 324 and 326. In this embodiment, the card processing system 10 may store reward data for the qualified transactions in associated debit card accounts in storage system 14 and transmits the reward data for debit card accounts to the merchant processing system 60 and authorized issuer systems 32-36.

Figure 12:
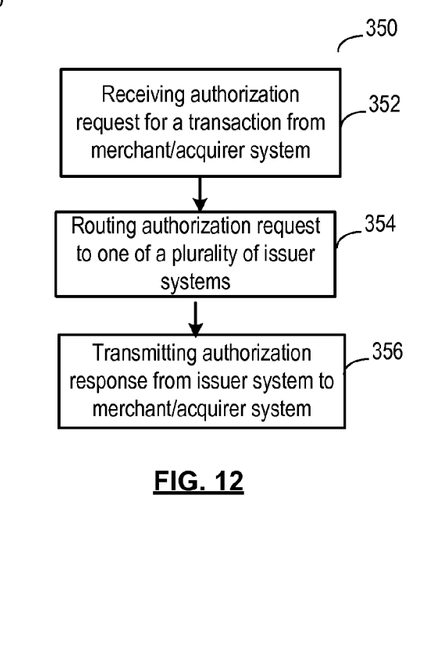
FIG. 12 is a logic diagram of an embodiment of an authorization method for processing transaction data in accordance with the present invention.

FIG. 12 is a logic diagram of an embodiment of an authorization method 350 for processing transaction data in accordance with the present invention. In step 352, the card processing system 10 receives an authorization request for a transaction from an acquirer system 48 or merchant system 40-46. In general, the authorization request is initiated when a merchant system 40-46 receives card information and obtains a transaction amount. The merchant system 40-46 transmits the card information and the transaction amount to an acquirer system 48 which combines the card information and the transaction amount into an authorization request. The acquirer system 48 then transmits the authorization request to the card processing system 10. The card processing system 10 routes the authorization request to one of a plurality of issuer system 32-326 in step 354. The issuer system 32-36 approves or denies the transaction in an authorization response transmitted to the card processing system 10. The card processing system 10 then forwards the authorization response from the issuer system 32-36 to the acquirer system 48 or merchant system 40-46 in step 356. In another embodiment, the card processing system 10 may perform a stand-in review and authorization for the issuer system 32-36. Thus, in an embodiment, transactions by debit card accounts under the merchant debit card program are authorized at the time of the transaction.

Figure 13:
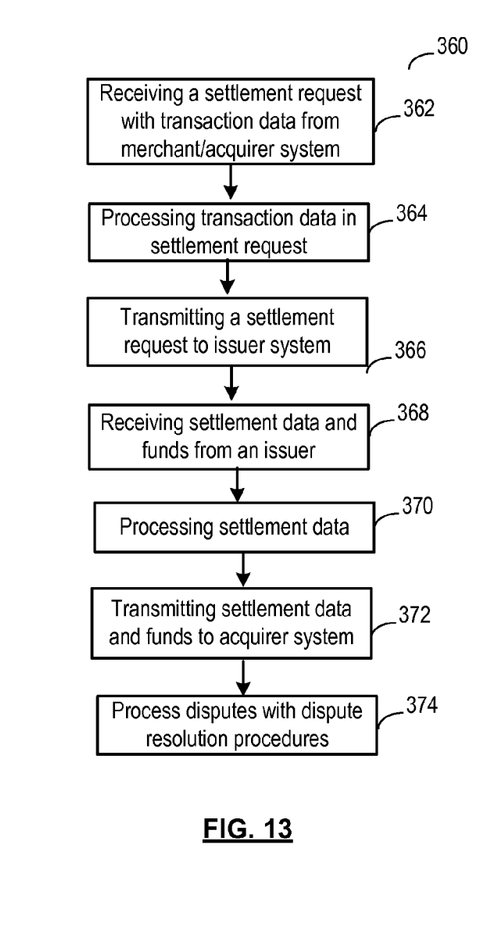
FIG. 13 is a logic diagram of an embodiment of a clearing and settlement method for processing transaction data in accordance with the present invention.

FIG. 13 is a logic diagram of an embodiment of a clearing and settlement method 360 for processing transaction data in accordance with the present invention. An acquirer system 48 formats transaction data into a settlement request and transmits it to the card processing system 10. In step 362, the card processing network 10 receives the settlement request and in step 364 processes the settlement request to calculate settlement obligations of the issuer, processing fees, and amount due the acquirer system. The card processing network 10 then transmits the settlement request to the issuer system 32-36 in step 366. The issuer system 32-36 transmits settlement data to the card processing network 10 and transfers settlement funds to a designated account of the card processing system 10 in step 368. The issuer processes the transaction data and debits each transaction separately from the customer's deposit account. The issuer system 32-36 also generates debit card account statements or deposit account statements which summarize the transactions and transaction data for a period of the customer's account. The account statements provide information on each transaction performed with the debit card account. Thus, in an embodiment, a customer has a list of each transaction performed with the debit card account and each transaction amount is separately listed on their deposit account statements.

In step 370, the card processing system 10 processes the settlement data and in step 372, transfers the settlement funds to the acquirer system 48. In addition, the card processing network 10 may assist in processing disputes over transactions or transaction data with dispute resolution procedures as shown in step 374. For example, a customer may dispute a transaction amount or assert that a transaction was committed fraudulently without authorization. The card processing system 10 may then initiate an investigation and a chargeback or reversal of financial liability of a particular transaction by the issuer system 32-36 to an acquirer system 48. This dispute resolution process provides extra protection to a customer account holder of a debit card account under the merchant debit card program.

Figure 14:
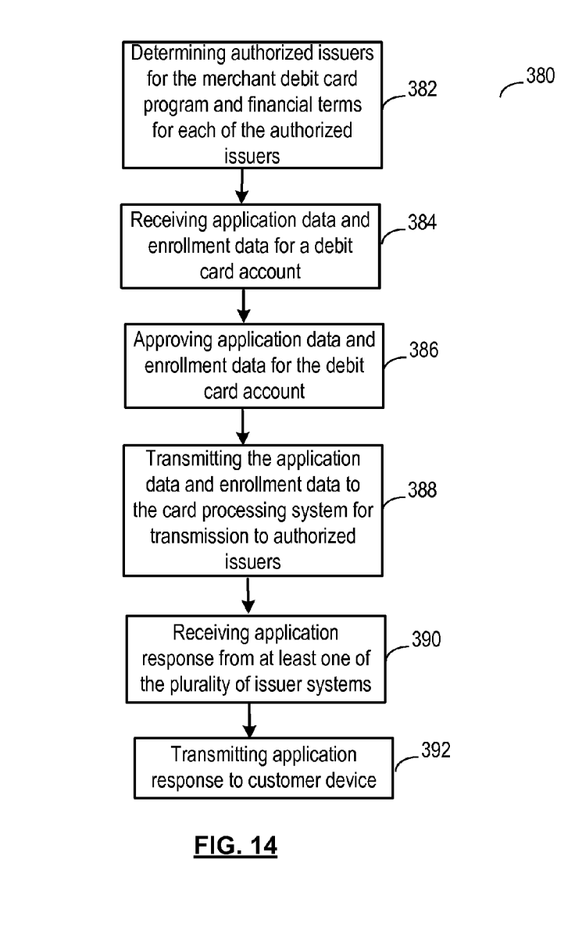
FIG. 14 is a logic diagram of another embodiment of a method for establishing a merchant debit card program data in accordance with the present invention.

FIG. 14 is a logic diagram of an embodiment of a method 380 for establishing a merchant debit card program data in accordance with the present invention. FIG. 14 illustrates an embodiment of some of the steps performed by the merchant processing system 60 for the merchant debit card program. In step 382, the merchant processing system 60 determines a plurality of authorized issuers for the merchant debit card program and financial terms for each of the authorized issuers. In step 384, the merchant processing system 60 receives application data and enrollment data for a debit card account. In step 386, the merchant processing system 60 approves the application data and enrollment data for the debit card account. In step 388, the merchant processing system 60 transmits the application data and enrollment data to the card processing system 10. In step 390, the merchant processing system 60 receives an application response from at least one of the plurality of issuer systems 32-36. In step 392, the merchant processing system 60 transmits the application response to the customer or customer device 54-56. In another embodiment, the issuer system 32-36 may provide the application response to the customer or customer device 54-56.

The embodiments of the merchant debit card program provide a merchant with the ability to have a plurality of issuers for their debit card accounts. This ability increases access to more customers over a broader geographic area rather than being restricted to customers of a single issuer. The card processing network described in embodiments herein facilities the interaction between the merchant and the plurality of issuers. For example, the card processing network helps facilitate creation of new debit card accounts and enrollment in the merchant loyalty program. In addition, the card processing system provides processing services such as processing transaction data to identify qualified transactions for the merchant loyalty program and processing qualified transactions to determine reward data for debit card accounts. The merchant debit card program with a plurality of issuers also maintains the direct relationship between the issuer and debit card account holder. The debit card account holder has access to their deposit account and visibility into each transaction with the debit card account. In addition, the card processing network provides transaction authorization processing, clearing and settlement and transaction dispute resolution procedures.

Figure 15:
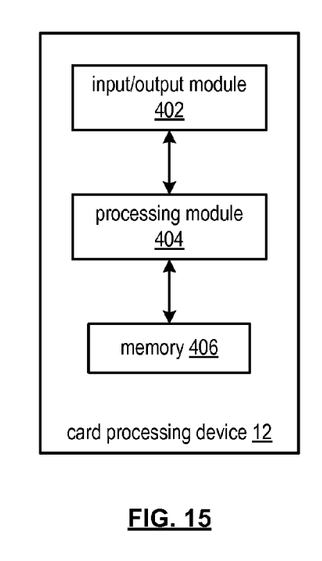
FIG. 15 is a schematic block diagram of an embodiment of a card processing device in accordance with the present invention.

FIG. 15 is a schematic block diagram of an embodiment of the card processing device 12 in accordance with the present invention. The card processing device 12 includes an input/output (I/O) module 402, a processing module 404 and a memory 406. In an embodiment, the card processing device 12 includes one or more servers, computers or similar processing devices. In such an embodiment, the processing module 404 includes a central processing unit; the memory 406 includes system memory, cache memory, and read only memory; the I/O module 402 includes a graphical user interface and/or a peripheral device interface (e.g., to connect to a mouse, a keyboard, etc.) and a video card, printer card, etc. In general, the processing module 404 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 404 may have internal memory and/or is coupled to memory 406. Memory 406 and internal memory may each be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the internal memory and/or memory 406 stores, and the processing module 404 is operable to execute, hard coded and/or operational instructions corresponding to steps and/or functions illustrated in FIGS. 1-14.

Figure 16:
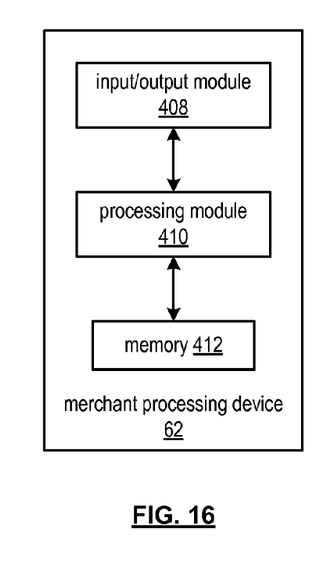
FIG. 16 is a schematic block diagram of an embodiment of a merchant processing device in accordance with the present invention.

FIG. 16 is a schematic block diagram of an embodiment of the merchant processing device 62 in accordance with the present invention. The merchant processing device 62 includes an input/output (I/O) module 408, a processing module 410 and a memory 412. In an embodiment, the merchant processing device 62 includes one or more servers, computers or similar processing devices. In such an embodiment, the processing module 410 includes a central processing unit; the memory 412 includes system memory, cache memory, and read only memory; the I/O module 408 includes a graphical user interface and/or a peripheral device interface (e.g., to connect to a mouse, a keyboard, etc.) and a video card, printer card, etc. In general, the processing module 410 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 410 may have internal memory and/or is coupled to memory 412. Memory 412 and internal memory may each be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the internal memory and/or memory 412 stores, and the processing module 410 is operable to execute, hard coded and/or operational instructions corresponding to steps and/or functions illustrated in FIGS. 1-14.

As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions. As may still further be used herein, the term "associated with", includes direct and/or indirect association of separate data and/or one data being embedded within another item.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. A computer-implemented method for a merchant debit card program, comprising:
    storing, at a card processing system, program data for a merchant debit card program associated with a merchant, the merchant being an entity that sells products and/or services to consumers and issues debit cards to consumers, the program data including issuer data identifying a plurality of authorized issuers, the issuers being entities that issue and manage deposit accounts associated with the debit cards issued by the merchant for consumers;
    receiving, at the card processing system from a consumer via the merchant, application data including a request for a debit card account and a request for a deposit account associated with the debit card account;
    identifying, at the card processing system, from the program data stored prior to receiving the application data from the consumer, more than one of the plurality of authorized issuers for communication of the request for a deposit account associated with the debit card account;
    transmitting the request for a deposit account associated with the debit card account from the card processing system to the identified more than one authorized issuers, the request for a deposit account requesting the identified more than one authorized issuers to issue and manage a deposit account for the consumer that is associated with the debit card account and is associated with a debit card issued by the merchant to the consumer;
    receiving, from more than one of the authorized issuers which the request for a deposit account was transmitted to, a response indicating acceptance or rejection of the request for a deposit account;
    forwarding the more than one received responses to the merchant; and
    storing, at the card processing system, debit card account information associated with the consumer and an issuer identifier identifying at least one authorized issuer that accepted the consumer's request for a deposit account and issued a deposit account for the consumer in response to the request.

2. The method of claim 1, wherein the application data received from the consumer via the merchant identifies more than one of the plurality of authorized issuers, identifying more than one of the plurality of authorized issuers includes reading the application data, and the application data is transmitted to the more than one authorized issuers identified by the application data.

3. The method of claim 1, wherein:
    identifying more than one of the plurality of authorized issuers includes selecting, by the card processing system, more than one of the authorized issuers identified by the issuer data using criteria including one or more of geographical region, application flow, and financial terms, wherein the application data is transmitted to the selected more than one authorized issuers.

4. The method of claim 1, wherein the application data is transmitted to at least a subset of the plurality of authorized issuers identified in the stored issuer data, a response indicating acceptance or rejection of the request for a deposit account is received from each of the subset of authorized issuers, at least some of the responses indicate acceptance of the request for a deposit account, and the method further comprises:
    selecting one of the authorized issuers that provided a response indicating acceptance of the request for a deposit account; and
    communicating the selection to at least the selected authorized issuer.

5. The method of claim 4, wherein the selection is performed by the card processing system using criteria including one or more of geographical region, application flow, and financial terms, and wherein the application data is transmitted to the selected authorized issuer.

6. The method of claim 4, wherein the selection is received by the card processing system from the merchant.

7. The method of claim 1, further comprising:
    receiving, at the card processing system from the consumer via the merchant, enrollment data indicating a request for enrollment in a merchant loyalty program associated with the debit card account; and
    transmitting the enrollment data from the card processing system to more than one of the authorized issuers identified in the stored issuer data.

8. The method of claim 1, wherein one or more debit card accounts are enrolled in a merchant loyalty program such that the accounts are eligible to receive rewards, and the method further comprises:
    receiving transaction data for a plurality of financial transactions; and
    processing the transaction data to identify qualified transactions, qualified transactions being transactions from debit card accounts enrolled in the merchant loyalty program that are eligible for rewards.

9. The method of claim 8, wherein processing the transaction data comprises:
    determining from the transaction data whether one or more debit card accounts used for the plurality of financial transactions is associated with the merchant debit card program;
    when a debit card account is associated with the merchant debit card program, determining from the transaction data whether the debit card account is enrolled in the merchant loyalty program;
    when the debit card account is enrolled in the merchant loyalty program, determining from the transaction data whether the transaction meets qualified transaction criteria for the merchant loyalty program; and when the transaction meets the qualified transaction criteria for the merchant loyalty program, identifying the transaction as a qualified transaction under the merchant loyalty program.

10. The method of claim 9, further comprising:
consolidating the transaction data for the qualified transactions under the merchant loyalty program; and
transmitting the transaction data for the qualified transactions to a merchant processing system.

11. The method of claim 8, further comprising:
processing the transaction data for the qualified transactions to determine reward data for debit card accounts enrolled in the merchant loyalty program.

12. The method of claim 11, wherein processing the transaction data comprises:
determining reward data for each financial transaction based on merchant loyalty program reward data;
determining the associated debit card account for each financial transaction; and
storing the reward data for each financial transaction in the associated debit card account.

13. The method of claim 12, further comprising:
transmitting the reward data for the debit card account to the authorized issuer of the debit card account.

14. A card processing system, comprising:
a proprietary network;
a storage system; and
a card processing device operable to:
store program data for a merchant debit card program associated with a merchant, the merchant being an entity that sells products and/or services to consumers and issues debit cards to consumers, the program data including issuer data identifying a plurality of authorized issuers, the issuers being entities that issue and manage deposit accounts associated with the debit cards issued by the merchant for consumers;
receive, from a consumer via the merchant, application data including a request for a debit card account and a request for a deposit account associated with the debit card account;
identify, from the program data stored prior to receiving the application data from the consumer, more than one of the plurality of authorized issuers for communication of the request for a deposit account associated with the debit card account;
transmit the request for a deposit account associated with the debit card account to the identified more than one authorized issuers, the request for a deposit account requesting the identified more than one authorized issuers to issue and manage a deposit account for the consumer that is associated with the debit card account and is associated with a debit card issued by the merchant to the consumer;
receive, from more than one of the authorized issuers which the request for a deposit account was transmitted to, a response indicating acceptance or rejection of the request for a deposit account;
forward the more than one received responses to the merchant; and
store debit card account information associated with the consumer and an issuer identifier identifying at least one authorized issuer that accepted the consumer's request for a deposit account and issued a deposit account for the consumer in response to the request.

15. The card processing system of claim 14, wherein the application data received from the consumer via the merchant identifies more than one of the plurality of authorized issuers, identify more than one of the plurality of authorized issuers includes reading the application data, and the application data is transmitted to the more than one authorized issuers identified by the application data.

16. The card processing system of claim 14, wherein identify more than one of the plurality of authorized issuers includes the card processing device selecting more than one of the authorized issuers identified by the issuer data using criteria including one or more of geographical region, application flow, and financial terms, wherein the application data is transmitted to the selected more than one authorized issuers.

17. The card processing system of claim 14, wherein the application data is transmitted to at least a subset of the plurality of authorized issuers identified in the stored issuer data, a response indicating acceptance or rejection of the request for a deposit account is received from each of the subset of authorized issuers, at least some of the responses indicate acceptance of the request for a deposit account, and the card processing device is further operable to:
select one of the authorized issuers that provided a response indicating acceptance of the request for a deposit account; and
communicate the selection to at least the selected authorized issuer.

18. The card processing system of claim 14, wherein the card processing device is further operable to:
receive enrollment data from the consumer via the merchant indicating a request for enrollment in a merchant loyalty program associated with the debit card account; and
transmit the enrollment data to more than one of the authorized issuers identified in the stored issuer data.

19. The card processing system of claim 14, wherein one or more debit card accounts are enrolled in a merchant loyalty program such that the accounts are eligible to receive rewards, and the card processing device is further operable to:
receive transaction data for a plurality of financial transactions; and
process the transaction data to identify qualified transactions, qualified transactions being transactions from debit card accounts enrolled in the merchant loyalty program that are eligible for rewards.

20. The card processing system of claim 19, wherein the card processing device is operable to process the transaction data by:
determining from the transaction data whether one or more debit card accounts used for the plurality of financial transactions is associated with the merchant debit card program;
when a debit card account is associated with the merchant debit card program, determining from the transaction data whether the debit card account is enrolled in the merchant loyalty program;
when the debit card account is enrolled in the merchant loyalty program, determining from the transaction data whether the transaction meets qualified transaction criteria for the merchant loyalty program; and
when the transaction meets the qualified transaction criteria for the merchant loyalty program, identifying the transaction as a qualified transaction under the merchant loyalty program.

21. The card processing system of claim 20, wherein the card processing device is further operable to:
consolidate the transaction data for the qualified transactions under the merchant loyalty program; and transmit the transaction data for the qualified transactions to a merchant processing system.

22. The card processing system of claim 19, wherein the card processing device is further operable to process the transaction data for the qualified transactions to determine reward data for debit card accounts enrolled in the merchant loyalty program.

23. The card processing system of claim 22, wherein the card processing device is operable to process the transaction data by:
determining reward data for each financial transaction based on merchant loyalty program reward data;
determining the associated debit card account for each financial transaction; and
storing the reward data for each financial transaction in the associated debit card account.

24. The card processing system of claim 23, wherein the card processing device is further operable to transmit the reward data for the debit card account to the authorized issuer of the debit card account.

25. A computer-implemented method for a merchant debit card program, comprising:
storing, at a card processing system, program data for a merchant debit card program associated with a merchant, the merchant being an entity that sells products and/or services to consumers, the program data including issuer data identifying a plurality of authorized issuers, the issuers being entities that issue deposit accounts and/or debit card accounts to consumers;
receiving, at the card processing system from a consumer via the merchant, application data indicating a request for a deposit account and/or debit card account;
transmitting a request for a deposit account and/or debit card account for the consumer from the card processing system to more than one of the plurality of authorized issuers identified in the stored issuer data;
receiving, from one or more of the authorized issuers which the request for a deposit account and/or debit card account was transmitted to, a response indicating acceptance or rejection of the request;
forwarding the one or more received responses to the merchant; and
storing, at the card processing system, debit card account information associated with the consumer and an issuer identifier identifying at least one authorized issuer that accepted the consumer's request for a deposit account and/or debit card account and issued a deposit account and/or debit card account for the consumer in response to the request.

26. The method of claim 25, wherein the application data received from the consumer via the merchant identifies one or more of the plurality of authorized issuers, and the request for a deposit account and/or debit card account is transmitted to the one or more authorized issuers identified by the application data.

27. The method of claim 25, further comprising:
selecting, by the card processing system, at least one of the authorized issuers identified by the issuer data using criteria including one or more of geographical region, application flow, and financial terms, wherein the request for a deposit account and/or debit card account is transmitted to the selected at least one authorized issuer.

28. The method of claim 25, wherein the request is transmitted to at least a subset of the plurality of authorized issuers identified in the stored issuer data, a response indicating acceptance or rejection of the request is received from each of the subset of authorized issuers, at least some of the responses indicate acceptance of the request, and the method further comprises:
selecting one of the authorized issuers that provided a response indicating acceptance of the request; and
communicating the selection to at least the selected authorized issuer.

29. The method of claim 28, wherein the selection is performed by the card processing system using criteria including one or more of geographical region, application flow, and financial terms, and wherein the application data is transmitted to the selected authorized issuer.

30. The method of claim 28, wherein the selection is received by the card processing system from the merchant.

31. The method of claim 25, further comprising:
receiving, at the card processing system from the consumer via the merchant, enrollment data indicating a request for enrollment in a merchant loyalty program associated with the deposit account and/or debit card account; and
transmitting the enrollment data from the card processing system to one or more of the authorized issuers identified in the stored issuer data.

32. The method of claim 25, wherein one or more debit card accounts are enrolled in a merchant loyalty program such that the accounts are eligible to receive rewards, and the method further comprises:
receiving transaction data for a plurality of financial transactions; and
processing the transaction data to identify qualified transactions, qualified transactions being transactions from debit card accounts enrolled in the merchant loyalty program that are eligible for rewards.

33. The method of claim 32, wherein processing the transaction data comprises:
determining from the transaction data whether one or more debit card accounts used for the plurality of financial transactions is associated with the merchant debit card program;
when it is determined that a debit card account is associated with the merchant debit card program, determining from the transaction data whether the debit card account is enrolled in the merchant loyalty program;
when it is determined that the debit card account is enrolled in the merchant loyalty program, determining from the transaction data whether the transaction meets qualified transaction criteria for the merchant loyalty program; and
when it is determined that the transaction meets the qualified transaction criteria for the merchant loyalty program, identifying the transaction as a qualified transaction under the merchant loyalty program.

34. The method of claim 33, further comprising:
consolidating the transaction data for the qualified transactions under the merchant loyalty program; and
transmitting the transaction data for the qualified transactions to a merchant processing system.

35. The method of claim 32, further comprising:
processing the transaction data for the qualified transactions to determine reward data for debit card accounts enrolled in the merchant loyalty program.

36. The method of claim 35, wherein processing the transaction data comprises:
determining reward data for each financial transaction based on merchant loyalty program reward data;
determining the associated debit card account for each financial transaction; and storing the reward data for each financial transaction in the associated debit card account.

37. The method of claim 36, further comprising: transmitting the reward data for the debit card account to the authorized issuer of the debit card account.

38. A card processing system, comprising:
a proprietary network;
a storage system; and
a card processing device operable to:
store program data for a merchant debit card program associated with a merchant, the merchant being an entity that sells products and/or services to consumers, the program data including issuer data identifying a plurality of authorized issuers, the issuers being entities that issue deposit accounts and/or debit card accounts to consumers;
receive, from a consumer via the merchant, application data indicating a request for a deposit account and/or debit card account;
transmit a request for a deposit account and/or debit card account for the consumer from the card processing system to more than one of the plurality of authorized issuers identified in the stored issuer data;
receive, from one or more of the authorized issuers which the request for a deposit account and/or debit card account was transmitted to, a response indicating acceptance or rejection of the request;
forward the one or more received responses to the merchant; and
store debit card account information associated with the consumer and an issuer identifier identifying at least one authorized issuer that accepted the consumer's request for a deposit account and/or debit card account and issued a deposit account and/or debit card account for the consumer in response to the request.

39. The card processing system of claim 38, wherein the application data received from the consumer via the merchant identifies one or more of the plurality of authorized issuers, and the request for a deposit account and/or debit card account is transmitted to the one or more authorized issuers identified by the application data.

40. The card processing system of claim 38, wherein the card processing device is further operable to select at least one of the authorized issuers identified by the issuer data using criteria including one or more of geographical region, application flow, and financial terms, wherein the request for a deposit account and/or debit card account is transmitted to the selected at least one authorized issuer.

41. The card processing system of claim 38, wherein the request is transmitted to at least a subset of the plurality of authorized issuers identified in the stored issuer data, a response indicating acceptance or rejection of the request is received from each of the subset of authorized issuers, at least some of the responses indicate acceptance of the request, and the card processing device is further operable to:
select one of the authorized issuers that provided a response indicating acceptance of the request for a debit card account; and
communicate the selection to at least the selected authorized issuer.

42. The card processing system of claim 38, wherein the card processing device is further operable to:
receive enrollment data from the consumer via the merchant indicating a request for enrollment in a merchant loyalty program associated with the debit card account; and
transmit the enrollment data to one or more of the authorized issuers identified in the stored issuer data.

43. The card processing system of claim 38, wherein one or more debit card accounts are enrolled in a merchant loyalty program such that the accounts are eligible to receive rewards, and the card processing device is further operable to:
receive transaction data for a plurality of financial transactions; and
process the transaction data to identify qualified transactions, qualified transactions being transactions from debit card accounts enrolled in the merchant loyalty program that are eligible for rewards.

44. The card processing system of claim 43, wherein the card processing device is operable to process the transaction data by:
determining from the transaction data whether one or more debit card accounts used for the plurality of financial transactions is associated with the merchant debit card program;
when a debit card account is associated with the merchant debit card program, determining from the transaction data whether the debit card account is enrolled in the merchant loyalty program;
when the debit card account is enrolled in the merchant loyalty program, determining from the transaction data whether the transaction meets qualified transaction criteria for the merchant loyalty program; and
when the transaction meets the qualified transaction criteria for the merchant loyalty program, identifying the transaction as a qualified transaction under the merchant loyalty program.

45. The card processing system of claim 44, wherein the card processing device is further operable to:
consolidate the transaction data for the qualified transactions under the merchant loyalty program; and
transmit the transaction data for the qualified transactions to a merchant processing system.

46. The card processing system of claim 43, wherein the card processing device is further operable to process the transaction data for the qualified transactions to determine reward data for debit card accounts enrolled in the merchant loyalty program.

47. The card processing system of claim 46, wherein the card processing device is operable to process the transaction data by:
determining reward data for each financial transaction based on merchant loyalty program reward data;
determining the associated debit card account for each financial transaction; and
storing the reward data for each financial transaction in the associated debit card account.

48. The card processing system of claim 47, wherein the card processing device is further operable to transmit the reward data for the debit card account to the authorized issuer of the debit card account.

* * * * *